United States Patent [19]

Warner

[11] 4,015,483
[45] Apr. 5, 1977

[54] VEHICLE TRANSMISSION
[75] Inventor: Peter Stuart Warner, Henlow, England
[73] Assignee: Joseph Lucas Limited, Birmingham, England
[22] Filed: Nov. 25, 1975
[21] Appl. No.: 635,231
[30] Foreign Application Priority Data
Nov. 29, 1974 United Kingdom ............ 51715/74
[52] U.S. Cl. ................................. 74/230; 184/6.12
[51] Int. Cl.² .................... F16H 57/04; F01M 9/10
[58] Field of Search ............ 74/467, 230, 218, 220, 74/217 C; 184/6.12, 6.27, 6.28, 26, 27 R
[56] References Cited
UNITED STATES PATENTS

| | | |
|---|---|---|
| 2,488,071 | 11/1949 | Young ................................. 74/218 |
| 2,535,703 | 12/1950 | Smith et al. ....................... 184/6.12 |
| 2,560,233 | 7/1951 | Maier ................................ 184/6.12 |
| 2,590,870 | 4/1952 | Keese ............................... 184/6.12 |
| 2,638,173 | 5/1953 | Dunham ......................... 184/6.12 X |
| 2,773,562 | 12/1956 | Thomas ............................. 184/27 R |
| 3,146,629 | 9/1964 | Schmitter ........................ 74/467 X |
| 3,263,609 | 8/1966 | Bystricky et al. ............. 184/27 R X |
| 3,738,452 | 6/1973 | Hausinger ........................ 74/467 X |

Primary Examiner—Leonard H. Gerin

[57] ABSTRACT

A vehicle transmission having a casing including a lubricant sump, a rotary shaft and a differential unit in the casing, drive means between them and a lubricant pump driven by the shaft to lift lubricant from the sump and discharge it onto the moving parts.

5 Claims, 1 Drawing Figure

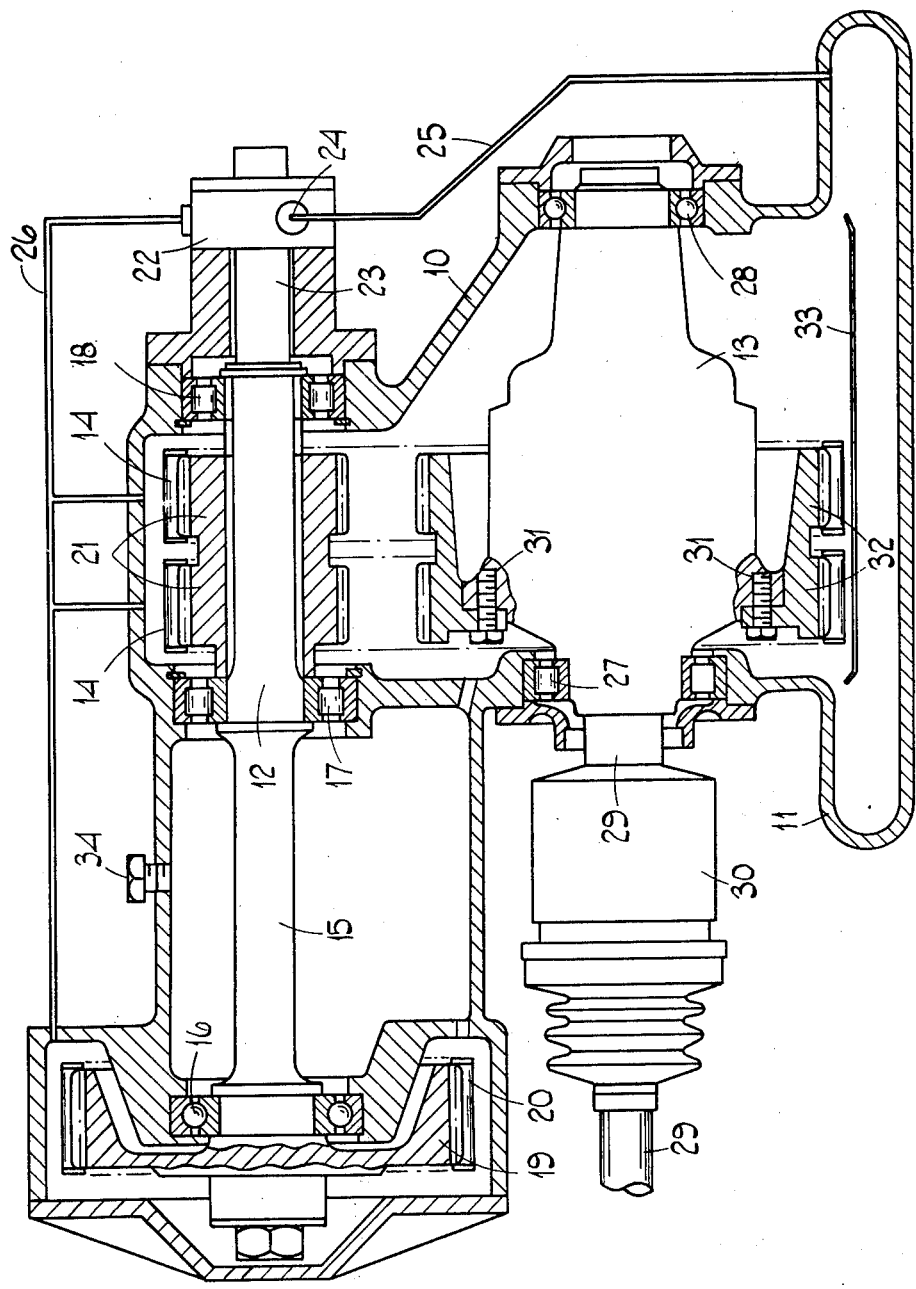

VEHICLE TRANSMISSION

This invention relates to a vehicle transmission and is particularly, though not exclusively, concerned with a vehicle transmission for use in a vehicle having a battery powered electric motor as the prime mover. A vehicle transmission system including provisions for changing the vehicle speed is known from French Pat. No. 2,104,333, but this known device suffers from the disadvantage that lubricant is pumped from below the level of the moving parts within the casing to discharge over those moving parts a supply of lubricant, which creates a viscous drag for belts or chain drives when immersed in such a lubricant.

It is accordingly the object of this invention to provide a vehicle transmission of efficient form and in which power losses due to operation of lubrication supplying arrangements are minimised.

According to the present invention, there is provided a vehicle transmission comprising a casing including a sump for lubricating fluid, a rotary shaft and a differential unit mounted in said casing, drive means between the differential unit and the shaft said rotary shaft, differential unit and drive means being disposed above a normal lubricant level in the sump and a lubricating fluid pump driven by said shaft, said pump having an inlet communicating with the sump and an outlet arranged in use, to discharge pressurised lubricating fluid onto moving parts of the transmission internally of the casing.

With such a construction, none of the moving parts are actually provided in the sump so that there are no energy losses in the transmission resulting from drag due to parts of the transmission moving through the relatively viscous lubricating fluid in the sump.

Preferably, the drive means comprises at least one sprocket mounted on the shaft, at least one sprocket mounted on the differential unit, and at least one belt or chain engaging with both the sprockets.

Alternatively a gear train interconnects said shaft and said differential unit.

Conveniently, the pump has a drive shaft which is attached to said rotary shaft and is co-axial therewith.

Part of the rotary shaft may be torsionally resilient.

In a preferred embodiment, the or each sprocket on the shaft is disposed at the opposite end of said torsionally resilient part to a sprocket arranged to be driven by an engine to which in use the transmission is connected.

An embodiment of the present invention will now be described, by way of example, with reference to the accompanying drawing which is a longitudinal sectional view through a vehicle transmission according to the present invention.

The vehicle transmission illustrated in the drawing is intended for supplying power to a pair of wheels (not shown) from a prime mover in the form of an electric motor (not shown) which in turn is powered from a plurality of storage batteries on the vehicle. The vehicle transmission comprises a casing 10 having a lower portion defining a sump 11, a rotary shaft 12, a differential unit 13, and a pair of drive chains 14 disposed in the casing 10 above the sump 11.

The shaft 12 has an unsupported and relatively narrow torsionally resilient portion 15. This is near one end of the shaft. This end of the shaft is supported in the casing by a ball bearing 16. The other end of the shaft 12 is splined nearly to the end of the torsionally resilient portion 15. At opposite ends of the splines moreover, there are respective roller bearings, 17, 18 which also serve to journal the shaft 12 in the casing. At the end of the shaft 12 at which the bearing 16 is located there is, provided a sprocket 19 which is arranged to be driven by the electric motor through the intermediary of a steel, endless chain 20 of the kind sold under the trademark "Hyvo". On the splined portion of the shaft and therefore at the opposite end of the torsionally resilient portion 15, from the sprocket 19 a pair of integrally interconnected sprockets 21 are fixed to the shaft 12. These mesh with chains 14 which are of a similar type to the chain 20. At the opposite end of the shaft 12 to the engine driven sprocket 19, a reversible drive oil pump 22 is mounted on the casing 10. This has a drive shaft 23 which is keyed to the shaft 12 and is co-axial therewith. The oil pump 22 is provided with an inlet 24 connected by means of a line, shown schematically at 25, leading to the sump 11. The oil pump has an outlet connected with a branched line 26 extending into the casing 10 above respective sprockets 19 and 21.

The differential unit 13 is mounted for rotation in the casing 10 in bearings 27 and 28 at its ends respectively and has a pair of output shafts 29 (only one of which is shown) connected with respective drive wheels of the motor vehicle through universal drive joints 30 (only one of which is shown). Attached to the exterior of the differential unit 13 by means of bolts 31 is a pair of integrally interconnected sprockets 32 which mesh respectively with the chains 14. The sump has a guard 33 which limits surging of oil in the sump 11 to ensure that the pipe 25 for picking up oil for the pump 22 is always immersed within the oil. An air breather 34 is fitted to the top of the casing.

In use the electric motor rotates the engine driven sprocket 19 by means of the endless chain 20. Drive is transmitted to the sprockets 21 through the torsionally resilient portion 15 of the shaft 12. Drive is transmitted to the differential unit 13 through the endless chains 14 to effect rotation of output shafts 29 and thence the wheels of the motor vehicle. At the same time, rotation of the shaft 12 also causes rotation of the shaft 23 of the oil pump 22 which draws lubricating oil from the sump 11 through the line 25 and provides a pressurised discharge of lubricating oil through the branched line 26 onto the sprockets 19 and 21. Thus, the sprockets 19 and 21 as well as the chains 14 and 20 are lubricated by pressurised lubricant. Lubrication of the sprockets 32 occurs by gravity feed from the sprockets 21 and also by oil transferred by the chains 14. As can be seen from the drawing all of the moving parts of the transmission within the casing 10 are disposed above a normal lubricant level in the sump 11 so that no energy losses occur as a result of any moving parts dragging through oil in the sump 11.

The torsionally resilient portion 15 of the shaft 12 serves to absorb torsional load surges due, for example, to regenerative braking of the electric motor. The reversible nature of the oil pump 22 ensures that the sprockets 19, 21 and 32 and the chains 14 and 20 are constantly supplied with lubricating oil even when the electric motor is reversed for driving the vehicle in reverse.

In an alternative construction, belts may replace one or more of the chains. In a further alternative form, a gear train interconnects the shaft 12 with the differential unit 13.

I claim:

1. A vehicle transmission comprising a casing including a sump for lubricating fluid, a rotary shaft and a differential unit mounted one above the other in said casing, at least one drive operatively interconnecting said differential unit and said rotary shaft, said rotary shaft, differential unit and drive means being disposed above a normal lubricant level in the sump, and a lubricating fluid pump driven by said shaft, said pump having an inlet communicating with the sump, and an outlet arranged in use to discharge pressurized lubricating fluid onto moving parts of the transmission internally of the casing.

2. A vehicle transmission as claimed in claim 1 in which the drive means comprises at least one sprocket mounted on the shaft, at least one sprocket mounted on the differential unit, and at least one belt or chain engaging with both the sprockets.

3. A vehicle transmission as claimed in claim 1 in which the pump has a drive shaft which is attached to said rotary shaft and is co-axial therewith.

4. A vehicle transmission as claimed in claim 1 in which part of the rotary shaft is torsionally resilient.

5. A vehicle transmission as claimed in claim 4 in which the drive means and an input drive means to the shaft are situated at opposite ends of the torsionally resilient part of the shaft respectively.

* * * * *